United States Patent [19]
Bryant et al.
[11] Patent Number: 4,970,109
[45] Date of Patent: Nov. 13, 1990

[54] KNITTED BARRIER FABRIC

[75] Inventors: Kenneth G. Bryant, Charlotte; Billy Bryant, Dallas, both of N.C.

[73] Assignee: Conductex, Inc., Charlotte, N.C.

[21] Appl. No.: 348,324

[22] Filed: May 5, 1989

Related U.S. Application Data

[63] Continuation-in-part of Ser. No. 132,122, Dec. 14, 1987, Pat. No. 4,856,299, which is a continuation-in-part of Ser. No. 940,864, Dec. 12, 1986, Pat. No. 4,815,299.

[51] Int. Cl.[5] .................... B32B 9/00
[52] U.S. Cl. .................... 428/254; 428/253; 428/922
[58] Field of Search .................... 428/253, 254, 922

[56] References Cited

U.S. PATENT DOCUMENTS 3,179,534 4/1965 Law .................... 428/254
3,431,140 3/1969 Beachem .................... 428/254
3,871,909 3/1975 Aldrich .................... 428/254
4,666,764 5/1987 Hobayashi et al. .................... 428/254
4,891,264 1/1990 Daimon et al. .................... 428/254

*Primary Examiner*—James J. Bell
*Attorney, Agent, or Firm*—Kenyon & Kenyon

[57] ABSTRACT

A launderable cloth-like product and a method for making same are provided wherein such product is a readily manufactured knitted fabric comprised of non-conductive yarn fibers that form a combined stitch construction providing a matrix that is liquid impermeable while remaining relatively gas permeable. In a preferred embodiment the present invention comprises nonconductive and conductive yarn fibers that form overlaps and underlaps to such an extent so as to form a combined stitch construction providing a matrix that is resistant to the build-up of a static charge, and the resulting grid pattern results in increased tear-resistance.

7 Claims, 1 Drawing Sheet

KNITTED BARRIER FABRIC

BACKGROUND OF THE INVENTION

This application is a continuation-in-part of U.S. Ser. No. 07/132,122, filed Dec. 14, 1987 now U.S. Pat. No. 4,856,299 which is a continuation-in-part of U.S. application Ser. No. 940,864, filed Dec. 12, 1986, now U.S. Letters Pat. No. 4,815,299, dated Mar. 28, 1989.

FIELD OF THE INVENTION

This invention relates to a new and improved knitted fabric having liquid impermeable properties, and which may be provided with electrical charge dissipation properties. The resulting fabric may also have low air-permeability.

DESCRIPTION OF THE PRIOR ART

The availability of a fabric that is liquid impermeable, while remaining relatively air-permeable, is important to individuals in certain professions. This is particularly true when such a fabric is incorporated into clothing that must provide protection from exposure to potentially dangerous or contaminated liquids, such as blood, oils, solvents or the like, but also needs to be relatively comfortable to the wearer.

The ability to resist penetration of moist contaminants is not always compatible with other factors considered desirable in fabrics and other materials, such as comfort, economy, safety and aesthetic appeal. Further, such materials should maintain integrity over the expected life of a garment or drape constructed therefrom.

There is virtually no end to materials that will provide a barrier to liquids, such as rubber, synthetic rubber and plastics, however, these materials are not acceptable in many settings. For example, the hospital worker faced with contact with potentially hazardous or contaminated liquids cannot be burdened with heavy-weight and relatively air-impermeable fabrics in garments designed as a barrier to such liquids. Similar limitations exist for the worker in a computer chip clean room, chemical plant, and the like. Those seeking to outfit the hospital worker must therefore contend with what can be conflicting goals, i.e., a need for an effective barrier against potentially harmful liquids and worker comfort. Such a barrier will also find logical uses in such areas as isolating a patient's body parts during surgery and other environments where workers are exposed to potentially harmful liquids, such as in an electronics plant clean room.

Further advantages sought in a fabric that is to be used in the above-noted settings are anti-static properties and relatively high tensile strength such that the fabric will minimize the formation of a static charge and is capable of a relatively high number of uses and washings. This goal of producing a fabric that can be repeatedly used is related to a desire to keep costs down.

The utilization of a combination of fibers to produce a woven structure, which is both relatively liquid impermeable and air permeable, is generally known.

For example, in U.S. Pat. No. 4,286,012, issued to Zins et al., a woven fabric comprised of cotton and polyester and having a total combined surface area of less than fifty-three thousand (53,000) microns per square inch is disclosed. Further, prior to the application thereto of any finish, the woven fabric has a wetting time greater than one-half minute. Zins also discloses that the interweaving blend of cotton and polyester is permeable to air, notwithstanding its liquid impermeable characteristics.

In U.S. Pat. No. 4,561,434, issued to Taylor, a launderable cloth-like product comprising a plurality of layers of woven material is disclosed. Taylor discloses a top layer made with warps and wefts in plain weave and a coating. A top layer coating having hydrophobic properties such that the top layer becomes substantially impermeable to water flow therethrough is provided. Further, the top layer coating provides anti-static properties.

In the known art, barrier fabrics have been formed out of woven and other non-knitted constructions because of perceived high absorbency and liquid permeability properties of knitted fabrics.

Assuming the desired liquid impermeability can be achieved, knitted fabrics exhibit a number of properties that make them particularly desirable for use in hospital, clean-room, and other settings. For example, it is known that non-knitted fabrics exhibit what is typically known as wicking characteristics wherein the over-and-under-lap of the threads that make up the fabric results in what might be termed a vulnerability to a "wick" effect. A wick effect is characterized in that contact with one side of the fabric will cause liquid on the other side of the fabric to wick through the fabric. A common example of this wick effect is seen in tent fabrics where it is known that touching the inside of the tent in a rainstorm will cause an undesirable "wick" through or leaking. As will be appreciated by those skilled in the art, such a wick-through effect is particularly undesirable in a barrier cloth. Many of the known barrier cloths suffer from such a limitation.

By contrast, knitted fabrics in general and the knitted fabric of the present invention are constructed in such a manner that contacting the threads on one side of the fabric will not result in a wick through effect from the threads on the opposite side of the fabric. Such non-wicking is a result of the layered construction of the knitted fabric, which results in a structure wherein contact with threads on one side of the fabric does not cause contact with threads on the other side of the fabric.

Yet, knitted fabrics, while known for their relative ease of production, corresponding lower cost, breathability and comfort, are also known for having high absorptive properties. Such high absorptive properties are necessarily undesirable when producing a barrier cloth.

A need exists in certain environments, therefore, for a means to provide a barrier from potentially harmful liquids that can be incorporated into the garments worn by or covering individuals. A preference exists that such a barrier in fact be provided by the fabric which makes up the garments worn by such individuals. A further need exists for such a liquid-resistant fabric to have anti-static properties and the ability to withstand repeated washings and wearing.

A need also exists for a relatively inexpensive easily knitted fabric capable of resisting absorption of fluids, having anti-static properties, and retaining these properties while being subjected to repeated wear and washings. Further, there is a need for a such a knitted fabric which can be manufactured on a conventional knitting machine that is not as mechanically complex as those required to produce woven fabrics.

ADVANTAGES AND SUMMARY OF THE INVENTION

It is an advantage of the present invention to provide such a knitted fabric in which liquids are repelled from the surface of the fabric and which may be constructed in a structure which resists the accumulation of a static charge.

It is a further advantage of the present invention to provide a knitted fabric having liquid repellant and antistatic properties that remain notwithstanding repeated wear and washings.

It is a still further advantage of the present invention to provide a knitted fabric which can be manufactured on a conventional knitted machine that is mechanically less complex that those required to produce woven fabrics.

The present invention provides a knitted barrier cloth comprises a knit structure of fiber stitches forming courses and wales, said fibers being heat-set in a dense construction and treated with a hydrophobic finish so that said fabric is substantially impermeable to liquid and gas permeable.

The present invention is also constructed in such a manner as to minimize the problem of undue garment shrinkage and shape distortion common to known woven and knitted fabrics. Garment shrinkage and shape distortion is minimized in the present invention by the use of short stitches on the top layer of the fabric. The use of short stitches has a two-fold effect. First, laundering of the fabric causes the short stitches to pull closer together, thereby increasing the desired barrier effect of the present invention. Second, the laundered short stitches can only shrink, at the very most, a short distance, thereby assuring that laundering will not effect the shape of the garment manufactured in the form of the present invention.

Further, in certain embodiments of the present invention where a conductive yarn is used, rip resistance may be increased by the conductive yarn forming a grid construction that reinforces the fabric along the courses and wales. As will be appreciated by those skilled in the art, such a grid pattern need not be formed by conductive fibers, but may also be formed of non-conductive fibers.

The invention also provides a method for making a knitted barrier cloth comprising the steps of knitting a structure of fiber stitches forming courses and wales; treating said dense fiber construction with a hydrophobic finish; and heat setting said knitted fibers in a dense construction.

DETAILED DESCRIPTION

Figure 1:
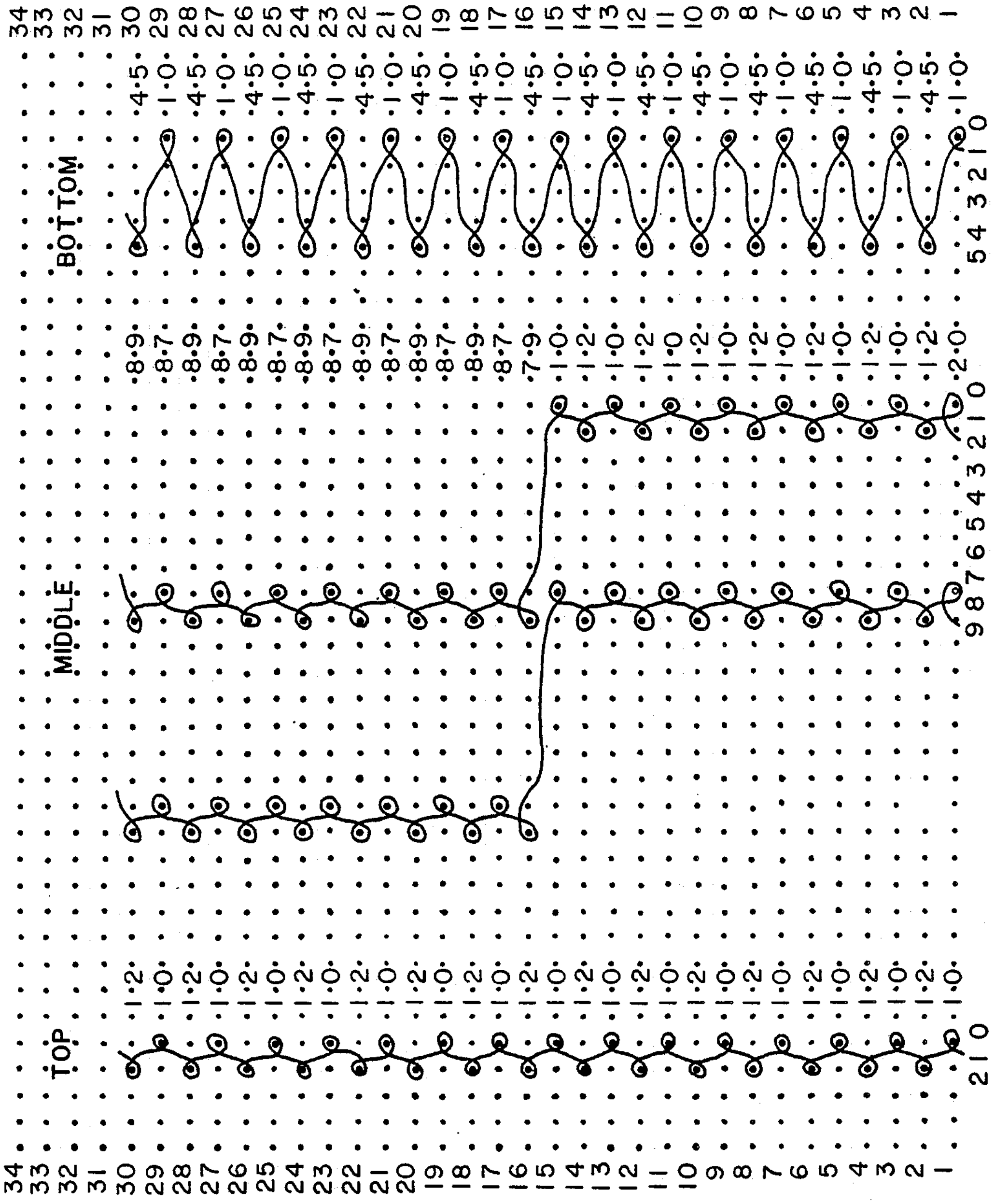
FIG. 1 is a lapping diagram which depicts the stitch formation of the present invention.

Referring to FIG. 1 the illustrated sequence of chain stitches may be formed on a knitting machine of the type well known in the art. See, e.g. "An Introduction to the Stitch Formation in Warp Knitting" 1.3, pp. 27–42 (Employees Assoc. Karl Mayer E. V., West Germany 1966) (hereinafter "Stitch Formations"), the entirety of which is incorporated herein by reference. A significant advantage of the present invention is that a knitting machine containing only 3 dedicated guild bars may be employed to fabricate the desired pattern of stitches.

EXAMPLE 1

An example of the hydrophobic and electrically conductive knitted fabric of the present invention was constructed as follows. The bottom bar of a Karl Mayer KE3 warp knit machine was threaded full with 70/48 S.D. polyester and stitched in the following sequence:

1-0, 4-5, 1-0, 4-5, 1-0, 4-5, 1-0, 4-5, 1-0, 4-5, 1-0, 4-5, 1-0, 4-5, 1-0, 4-5, 1-0, 4-5, 1-0; 4-5, 1-0, 4-5, 1-0, 4-5, 1-0, 4-5, 1-0, 4-5, 1-0, 4-5, 1-0, 4-5.

The middle bar of the machine was threaded 1 in 6 out with 40 denier polyester and 21/denier carbon suffused nylon thread and stitched in the following sequence:

2-0, 1-2, 1-0, 1-2, 1-0, 1-2, 1-0, 1-2, 1-0, 1-2, 1-0, 1-2, 1-0, 1-2, 1-0, 1-2, 1-0, 7-9, 8-7, 8-9, 8-7, 8-9, 8-7, 8-9, 8-7, 8-9, 8-7, 8-9, 8-7, 8-9, 8-7, 8-9.

An intermediate let off was set up for the middle bar on a ratio of 1.21 with a chain sequence as follows:

0-0, 3-3, 3-3, 3-3, 3-3, 3-3, 3-3, 3-3, 3-3, 3-3, 3-3, 3-3, 3-3, 3-3, 3-3, 3-3, 0-0, 0-0, 3-3, 3-3, 3-3, 3-3, 3-3, 3-3, 3-3, 3-3, 3-3, 3-3, 3-3, 3-3 3-3, 0-0.

The top bar was thread 1 end out and 6 ends in with 40 denier polyester and stitched in the following sequence:

1-0, 1-2, 1-0, 1-2, 1-0, 1-2, 1-0, 1-2, 1-0, 1-2, 1-0, 1-2, 1-0, 1-2, 1-0, 1-2, 1-0, 1-2, 1-0, 1-2, 1-0, 1-2, 1-0, 1-2, 1-0, 1-2, 1-0, 1-2, 1-0, 1-2, 1-0, 1-2.

The runner lengths for this fabric were:

top bar: 49 middle bar: 55 bottom bar: 98

The fabric quality pull was 8 inches per rack. The total ends for a 126 inch panel by bar were as follows:

top bar: 3012 ends middle bar: 501 ends bottom bar: 3516 ends.

The knitted fabric of the present invention is then provided with a hydrophobic finish by the steps of:

a. loosely framing the fabric;

b. calendaring the framed fabric; and c. heat setting the calendared fabric.

To prepare the barrier cloth of the present invention without a conductive yarn, the machine will be threaded as described in Example 1, except that the middle bar will be omitted and the top bar will be threaded through.

EXAMPLE 2

An electrically conductive knitted fabric may be constructed in accordance with this invention on a finer gauge machine to further educe air permeability and increase liquid impermeability. Such a fabric is made on a Karl Mayer KE 3 warp knitting machine with a finer yarn of less than about 1.5 denier per filament, e.g., a 70/68 or 70/72 S.D. polyester. The stitch is the same as that set forth in Example 1 with the top middle and lower being threaded in the same manner except that the number of needles per inch is about 32. Conventional techniques are employed to control the temperature, humidity and other processing conditions to prevent machine malfunction.

The hydrophobic characteristics of a fabric constructed in accordance with the present invention were tested and are set forth in Example 3.

EXAMPLE 3

| TEST PROCEDURE | Example 3 UNTREATED | TREATED |
|---|---|---|
| Water Repellency: Spray Test AATCC 22-1985 | 100 | 100 |
| Water Resistance Hydrostatic Pressure Test AATCC 127-1885 | 13.1 cm | 10.1 cm |
| Water Resistance Impact Penetration Test AATCC 42-1985 | 13.39 gm | 3.85 gm |

The wear characteristics of a fabric constructed in accordance with the present invention were tested and are set forth in Example 4.

EXAMPLE 4

| TEST PROCEDURE | | Example 4 UNTREATED | TREATED |
|---|---|---|---|
| Tensile Strength | Length | 84.6 | 76.3 |
| Aston D 1682-64 (Grab) | Width | 212.0 | 172.7 |
| Dimensional Change AATCC 135-1987 | | | |
| 1st Cycle | Length | 3.1 | 2.7 |
| | Width | 0.1 | +0.3 |
| 5th Cycle | Length | 4.7 | 3.6 |
| | Width | 0.05 | +0.3 |

It should be understood that this invention is not limited to the illustrations described and shown herein, which are deemed to be merely illustrative of the best modes of carrying out the invention. The invention also encompasses all such modifications which are within the scope of the following claims.

We claim:

1. A knitted barrier fabric comprised of a knit structure of fiber stitches forming courses and wales, said fibers being heat set in a dense construction and treated with a hydrophobic finish so that the fabric is substantially impermeable to liquid and gas permeable, and wherein the knit structure is comprised of stitches of nonconductive fibers knitted together with stitches of conductive fibers so as to form an electrically conductive matrix capable of dissipating a static charge in substantially any direction along the course and wale of the fabric.

2. The knitted barrier fabric of claim 1 wherein the conductive fibers are chosen from the group consisting of carbon suffused nylon; filamentary polymer substrates having finely divided, electrically-conductive particles embossed on the fiber surface; and graphite fibers.

3. The knitted barrier fabric of claim 1 wherein the conductive fibers consist of two or more conductive yarns plied together.

4. The knitted barrier fabric of claim 1 wherein the conductive fibers consist of a conductive yarn plied together with a nonconductive yarn.

5. A knitted barrier fabric fabricated by threading full the bottom bar of a three bar warp knit machine with 70/48 S.D. polyester stiched in the following sequence:

1-0, 4-5, 1-0, 4-5, 1-0, 4-5, 1-0, 4-5, 1-0, 4-5, 1-0, 4-5, 1-0, 4-5, 1-0, 4-5, 1-0, 4-5, 1-0, 4-5, 1-0, 4-5, 1-0, 4-5, 1-0, 4-5, 1-0, 4-5, 1-0, 4-5, 1-0, 4-5;

the middle bar of the machine threaded 1 in 6 out with a 40 denier polyester and 21/denier carbon suffused nylon thread and stitched in the following sequence:

2-0, 1-2, 1-0, 1-2, 1-0, 1-2, 1-0, 1-2, 1-0, 1-2, 1-0, 1-2, 1-0, 1-2, 1-0, 1-2, 1-0, 7-9, 8-7, 8-9, 8-7, 8-9, 8-7, 8-9, 8-7, 8-9, 8-7, 8-9, 8-7, 8-9, 8-7, 8-9 with an intermediate let off set up for the middle bar on a ration of 1.21 with a chain sequence as follows:

0-0, 3-3, 3-3, 3-3, 3-3, 3-3, 3-3, 3-3, 3-3, 3-3, 3-3, 3-3, 3-3, 3-3, 3-3, 3-3, 0-0, 0-0, 3-3, 3-3, 3-3, 3-3, 3-3, 3-3, 3-3, 3-3, 3-3, 3-3, 3-3, 3-3 3-3, 0-0 with a top thread 1 end out and 6 ends in with 40 denier polyester and stitched in the following sequence:

1-0, 1-2, 1-0, 1-2, 1-0, 1-2, 1-0, 1-2, 1-0, 1-2, 1-0, 1-2, 1-0, 1-2, 1-0, 1-2, 1-0, 1-2, 1-0, 1-2, 1-0, 1-2, 1-0, 1-2, 1-0, 1-2, 1-0, 1-2, 1-0, 1-2, 1-0, 1-2;

said knitted structure being heat set in a dense construction; and treating said knitted structure with a hydrophobic finish so that the fabric is capable of sustantially dissipating an electric charge and is substantially impermeable to liquid and gas permeable.

6. A knitted barrier fabric fabricated by threading full the bottom bar of a warp knit machine with 70/48 S.D. polyester stitched in the following sequence:

1-0, 4-5, 1-0, 4-5, 1-0, 4-5, 1-0, 4-5, 1-0, 4-5, 1-0, 4-5, 1-0, 4-5, 1-0, 4-5, 1-0, 4-5, 1-0, 4-5, 1-0, 4-5, 1-0, 4-5, 1-0, 4-5, 1-0, 4-5, 1-0, 4-5, 1-0, 4-5 threading the top bar full with 40 denier polyester and stiched in the following sequence:

1-0, 1-2, 1-0, 1-2, 1-0, 1-2, 1-0, 1-2, 1-0, 1-2, 1-0, 1-2, 1-0, 1-2, 1-0, 1-2, 1-0, 1-2, 1-0, 1-2, 1-0, 1-2, 1-0, 1-2, 1-0, 1-2, 1-0, 1-2, 1-0, 1-2, 1-0, 1-2;

said knitted structure being heat set in a dense construction; and treating said knitted structure with a hydrophobic finish so that the fabric is substantially impermeable to liquid and gas permeable.

7. A process for making a knitted barrier fabric comprising the steps of:

threading full the bottom bar of a warp knit machine with 70/48 S.D. polyester stitched in the following sequence:

1-0, 4-5, 1-0, 4-5, 1-0, 4-5, 1-0, 4-5, 1-0, 4-5, 1-0, 4-5, 1-0, 4-5, 1-0, 4-5, 1-0, 4-5, 1-0, 4-5, 1-0, 4-5, 1-0, 4-5, 1-0, 4-5, 1-0, 4-5, 1-0, 4-5, 1-0, 4-5;

threading the middle bar of the machine threaded 1in 6 out with a 40denier polyester and 21/denier carbon suffused nylon thread and stiched in the following sequence:

2-0, 1-2, 1-0, 1-2, 1-0, 1-2, 1-0, 1-2, 1-0, 1-2, 1-0, 1-2, 1-0, 1-2, 1-0, 1-2, 1-0, 7-9, 8-7, 8-9, 8-7, 8-9, 8-7, 8-9, 8-7, 8-9, 8-7, 8-9, 8-7, 8-9, 8-7, 8-9 with an intermediate let off set up for the middle bar on a ration of 1.21 with a chain sequence as follows:

0-0, 3-3, 3-3, 3-3, 3-3, 3-3, 3-3, 3-3, 3-3, 3-3, 3-3, 3-3, 3-3, 3-3, 3-3, 3-3, 0-0, 0-0, 3-3, 3-3, 3-3, 3-3, 3-3, 3-3, 3-3, 3-3, 3-3, 3-3, 3-3, 3-3 3-3, 0-0 with a top bar thread 1 end out and 6 ends in with 40 denier polyester and stitched in the following sequence:

1-0, 1-2, 1-0, 1-2, 1-0, 1-2, 1-0, 1-2, 1-0, 1-2, 1-0, 1-2, 1-0, 1-2, 1-0, 1-2, 1-0, 1-2, 1-0, 1-2, 1-0, 1-2, 1-0, 1-2, 1-0, 1-2, 1-0, 1-2, 1-0, 1-2, 1-0, 1-2;

heat setting said knitted structure in a dense construction; and treating said heat set structure with a hydrophobic finish so that the fabric is capable of sustantially dissipating an electric charge and is substantially impermeable to liquid and gas permeable.

* * * * *